United States Patent [19]
Hebiguchi et al.

[11] Patent Number: 6,137,557
[45] Date of Patent: *Oct. 24, 2000

[54] LIQUID CRYSTAL DISPLAY DEVICE

[75] Inventors: Hiroyuki Hebiguchi; Yasuhiko Kasama, both of Miyagi-ken, Japan

[73] Assignee: Frontec Incorporated, Miyagi-Ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/971,084

[22] Filed: Nov. 14, 1997

[30] Foreign Application Priority Data

Nov. 15, 1996 [JP] Japan ................................ 8-305387

[51] Int. Cl.[7] ........................ G02F 1/136; G02F 1/1343; G02F 1/139
[52] U.S. Cl. .............................................. 349/141; 349/38
[58] Field of Search ................................ 349/42, 43, 141, 349/143, 145, 38, 39; 345/87, 90, 92

[56] References Cited

U.S. PATENT DOCUMENTS 5,598,285  1/1997  Kondo et al. ............................ 349/39
5,786,876  7/1998  Ota et al. ................................ 349/143
5,905,556  5/1999  Suzuki et al. ........................... 349/141
5,995,186  11/1999 Hiroshi ................................... 349/141

FOREIGN PATENT DOCUMENTS 7-36058  2/1995  Japan .

Primary Examiner—William L. Sikes
Assistant Examiner—Tai V. Duong
Attorney, Agent, or Firm—Brinks Hofer Gilson & Lione

[57] ABSTRACT

In the liquid crystal display device of the invention, a liquid crystal layer is formed between a pair of transparent substrates, a plurality of linear electrodes which make a pair are disposed in a spaced, opposed relation on the liquid crystal layer side of one substrate, a switching element for applying a voltage between the paired linear electrodes and thereby applying a lateral electric field to the liquid crystal is disposed in the vicinity of the linear electrodes, one of the linear electrodes is used as a common electrode and the other as a pixel electrode, and at least one of the common electrode and the pixel electrode is formed at least partially in a non-parallel relation to the other to form a narrow spacing between both electrodes.

12 Claims, 9 Drawing Sheets

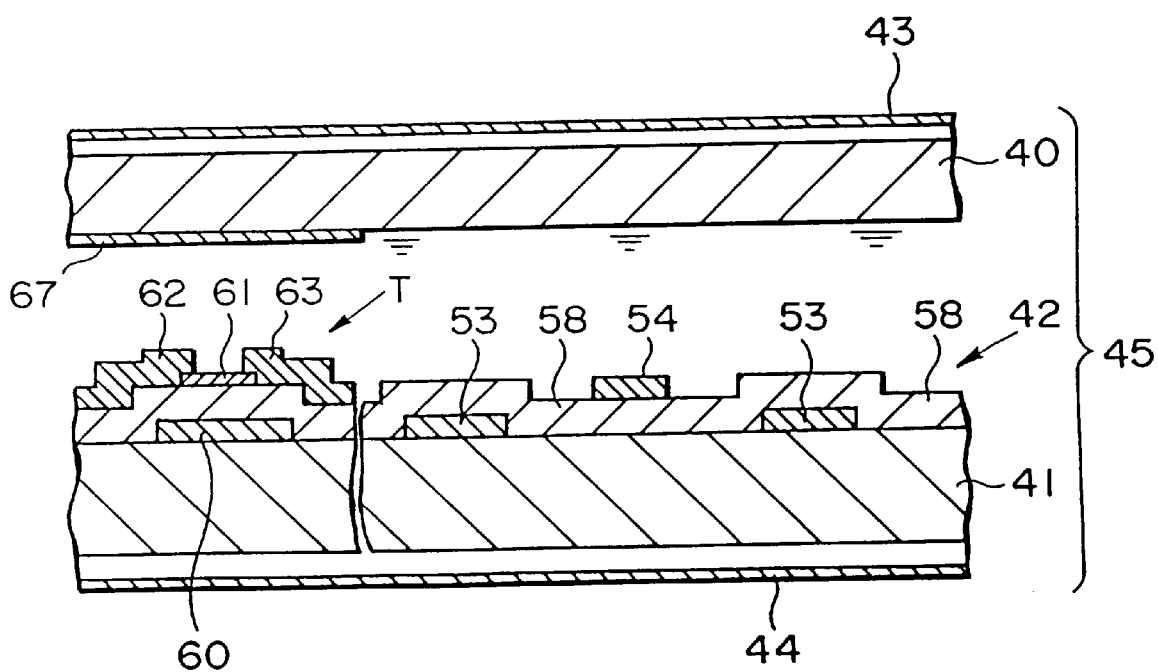

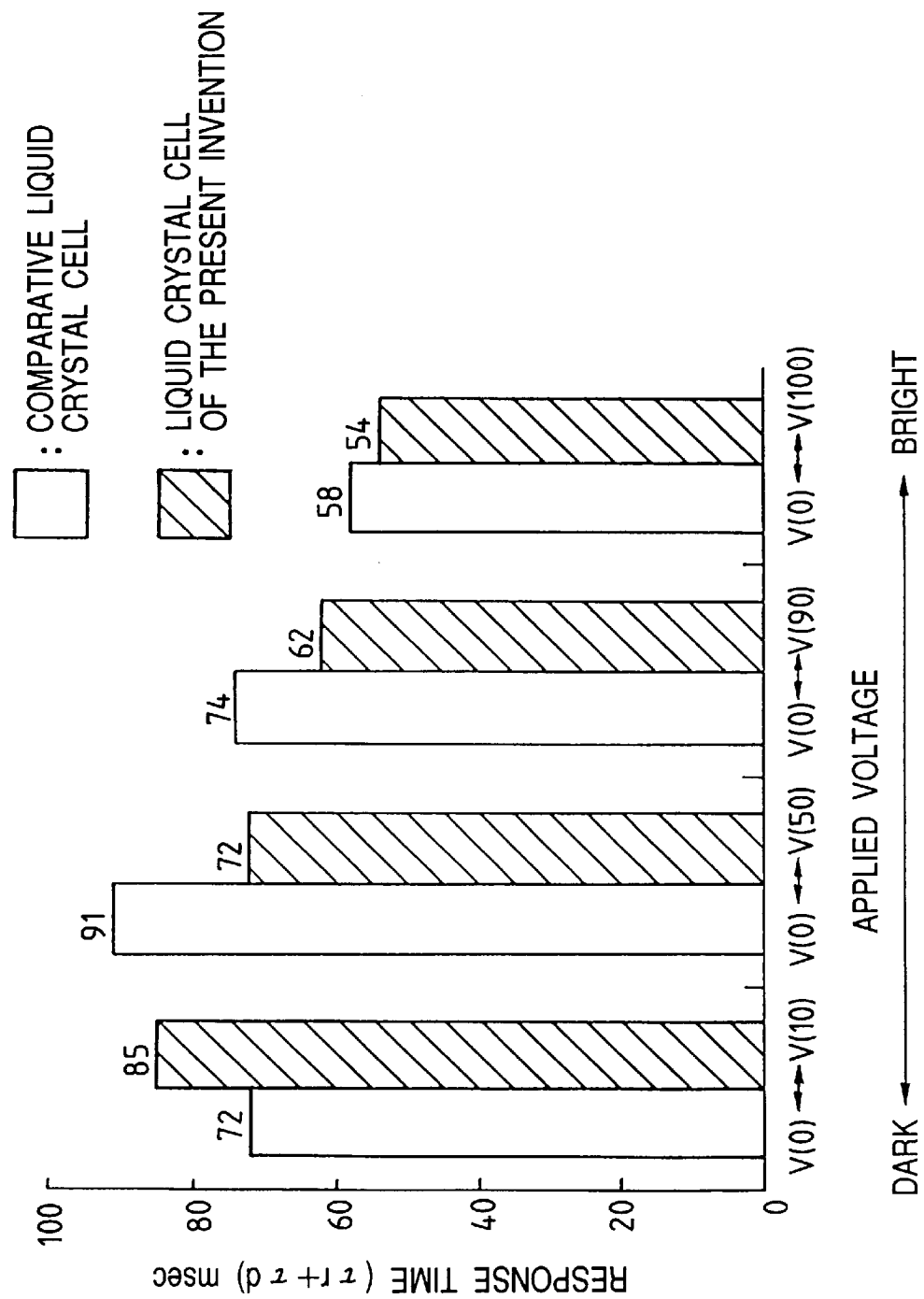

VOLTAGE OFF (DARK STATE)

VOLTAGE ON (BRIGHT STATE)

LIQUID CRYSTAL DISPLAY DEVICE

BACKGROUND OF THE INVENTION

The present invention relates to a liquid crystal display device for the display of various images, etc. and particularly to a liquid crystal display device high in both response speed and transmissivity.

Liquid crystal display devices are in wide use as display devices capable of being reduced in weight, size and thickness. Above all, an active matrix type liquid crystal display device of a twisted nematic mode (TN mode) is widely known as a display device low in both driving voltage and power consumption, high in contrast and capable of attaining a high definition.

A general TN mode liquid crystal display device of this type is constructed such that two glass substrates having polarizing plates, transparent electrodes and orienting films are disposed spacedly in an opposed relation to each other so as to be different 90° in orienting directions of the respective orienting films, with a nematic liquid crystal being disposed so as to permit 90° twisted arrangement thereof.

Recently, however, the field angle dependence of this type of a TN mode liquid crystal display device has been posing a problem. FIG. 7 shows a general field angle dependence of a TN mode liquid crystal display device. In the same figure, the angle (50°) represents an inclination from the normal direction and the hatched area represents an area of 10 or more in contrast (CR). According to FIG. 7, the TN mode liquid crystal display device is superior in visibility in the transverse direction, but it is apparent that the visibility in the vertical direction, especially the visibility from above, is extremely poor.

In view of the above point, the applicant in the present case has previously filed a liquid crystal display device capable of solving the above-mentioned problem, as Japanese Patent Laid-Open No. Hei 7(1995)-306276.

According to the construction of the patent application, it is not that a liquid crystal driving electrode is provided on each of upper and lower substrates which sandwich a liquid crystal therebetween, but two types of linear electrodes 12 . . . and 13 . . . of different poles are formed spacedly from each other on only the lower substrate 11 shown in FIG. 8, while no electrode is formed on the upper substrate 10 as in FIG. 9. With a voltage applied, liquid crystal molecules 36 can be oriented in the direction of a lateral electric field generated between the linear electrodes 12 and 13.

More specifically, the linear electrodes 12 are connected together at a base line portion 14 to constitute a comb teeth-like electrode 16, while the linear electrodes 13 are connected together at a base line portion 15 to constitute a comb teeth-like electrode 17, in such a manner that the linear electrodes 12 and 13 of the comb teeth-like electrodes 16 and 17 are in an alternately adjacent and meshed state but not in contact with each other. A power supply 18 and a switching element 19 are connected to the base line portions 14 and 15.

As shown in FIG. 10A, an orienting film is formed on the liquid crystal side of the upper substrate 10, to which is applied an orienting treatment to arrange liquid crystal molecules 36 in β direction, while on the liquid crystal side of the lower substrate 11 is formed an orienting film, to which is applied an orienting treatment to arrange liquid crystal molecules 36 in γ direction parallel to the β direction. To the substrate 10 is laminated a polarizing plate having a polarizing direction in the β direction in FIG. 10A, while to the substrate 11 is laminated a polarizing plate having a polarizing direction in the α direction in the same figure.

According to the above construction, when no voltage is applied between the linear electrodes 12 and 13, the liquid crystal molecules are oriented homogeneously in the same direction, as shown in FIGS. 10A and 10B. Light which has passed through the lower substrate 11 in this state has been polarized in the α direction by the polarizing plate on the lower substrate and it passes through the layer of liquid crystal molecules 36 and reaches the polarizing plate of the different polarizing direction β on the upper substrate 10, so that it is cut off by that polarizing plate. Thus, the light does not pass through the liquid crystal display device, which device therefore assumes a dark state.

Next, when a voltage is applied between the linear electrodes 12 and 13, the closer to the lower substrate 11 the liquid crystal molecules 36, the more perpendicularly are changed their orienting direction relative to the longitudinal direction of the linear electrodes 12. To be more specific, by a lateral electric field generated by the linear electrodes 12 and 13, there are generated electric lines of force perpendicular to the longitudinal direction of those linear electrodes, resulting in that the liquid crystal molecules 36 oriented with their longitudinal direction facing the γ direction by the orienting film formed on the lower substrate 11 are changed their orienting direction into the α direction perpendicular to the γ direction by a restricting force of the electric field stronger than the restricting force of the orienting film.

Thus, the application of a voltage between the linear electrodes 12 and 13 causes a 90° twisted orientation, as shown in FIGS. 11A and 11B. In this state, the polarized light which has passed through the lower substrate 11 and has been polarized in the α direction is changed its polarizing direction by the twisted liquid crystal molecules 36, so that it can now pass through the upper substrate 10 having a polarizing plate in the β direction different from the α direction and hence the liquid crystal display device assumes a bright state.

FIGS. 12 and 13 show a structure which is assumed to be available when the liquid crystal display device provided with the linear electrodes 12 and 13 of the above structure is applied to an actual active matrix liquid crystal drive circuit.

In the structure shown in FIGS. 12 and 13, a gate electrode 21 and first linear electrodes 22,22, as metallic electrodes, are formed spacedly in parallel with each other on a transparent substrate 20 such as a glass substrate for example, and a gate insulating film 24 is formed so as to cover those electrodes. Further, a source electrode 27 and a drain electrode 28 are formed so as to sandwich a semiconductor film 26 from both right and left sides on the gate insulating film 24 at a position just above the gate electrode 21. On the gate insulating film 24 and between the first linear electrodes 22 and 22 is formed a second linear electrode 29 as a metallic electrode. A planar structure of the structure shown in FIG. 12 is illustrated in FIG. 13, in which gate lines 30 and signal lines 31 are formed in matrix shape on the transparent substrate 20. Further, at a corner portion of each of areas surrounded with the gate lines 30 and the signal lines 31 is formed a gate electrode 21 by drawing out from the associated gate line 30, and the second linear electrode 29 is connected to the drain electrode 28 through a base line portion 33. The first linear electrodes 22 are arranged planarly so as to sandwich both sides of the second linear electrode 29 therebetween and are connected with each other through a base line portion 34. The base line portions 33 and 34 are superimposed one on the other through the gate insulating film 24 shown in FIG. 12 to ensure capacitance in this portion.

In the above structure, a lateral electric field is exerted so as to form electric lines of force in the directions indicated by arrows in FIGS. 12 and 13, so that the liquid crystal molecules 36 are oriented as in FIG. 12 in accordance with the lateral electric field.

Although the above structure of the liquid crystal display device has a merit of the field angle being extremely wide, it involves the problem that the opening ratio is small and the response speed is low.

The problem that the opening ratio is small can be coped with by adjusting the brightness of the back light provided in the liquid crystal display device, and the problem that the response speed is low can be coped with by increasing the applied voltage, taking into account the property of the liquid crystal that its response speed depends on the electric field intensity and the stronger the electric field, the higher the response speed.

However, since the above remedial measures premise that the power consumption is sacrificed, there still remain the problem that the liquid crystal device cannot be diminished its power consumption.

According to another countermeasure, the distance among the linear electrodes 22, 29 and 22 is made short to increase the electric field intensity and thereby improve the response speed. However, this method causes an increase in the number of electrodes, and the electrode width is restricted to the level of the wiring technique and cannot be made smaller than a certain value, resulting in a decrease of the opening ratio. Thus, also in this method there arises the necessity of making the back light brighter to compensate for the decrease of the opening ratio, and this leads to the problem that it is impossible to decrease the power consumption.

In liquid crystal display, when viewed from the standpoint of human engineering, the human eyes tend to easily recognize a low response speed in half tone and bright display. Therefore, a high-speed response of liquid crystal is desired in half tone and bright display.

SUMMARY OF THE INVENTION

The present invention has been accomplished in view of the above-mentioned circumstances and it is an object of the invention to provide a liquid crystal display device capable of attaining a high response speed without increasing the power consumption, capable of improving the response speed in half tone and bright display and having a wide field angle characteristic.

According to the present invention, for solving the foregoing problems, there is provided a liquid crystal display device comprising: a pair of substrates; a liquid crystal layer formed between the paired substrates; a plurality of linear electrodes which make a pair and which are formed in a spaced, opposed relation on the liquid crystal layer side of one the substrate; and a switching element for applying a voltage between the paired linear electrodes and thereby applying a lateral electric field to the liquid crystal, the switching element being disposed in the vicinity of the linear electrodes wherein one of the linear electrodes is used as a common electrode and the other is used as a pixel electrode, and at least one of the common electrode and the pixel electrode is formed at least partially in a non-parallel relation to the other to form a narrow spacing between both electrodes.

Thus, at least one of the common electrode and the pixel electrode is formed at least partially in a non-parallel relation to the other electrode, thereby forming a narrow spacing between both electrodes. In this narrow spacing the paired electrodes are close to each other, so that the electric field for driving the liquid crystal becomes stronger. In this narrow spacing, therefore, the liquid crystal begins to be oriented earlier than in the other area, whereby not only the response speed is improved but also the response speed in half tone and bright display, namely in a medium to larger range of applied voltage, in which display or range a problem is apt to arise in point of response speed, is improved. Besides, the field angle is wide because the display and non-display are changed over from one to the other by a lateral electric field.

The above construction may be combined with a construction wherein gate lines and signal lines are formed in a matrix shape on the liquid crystal layer side on one of the substrates, the common electrode and the pixel electrode, as well as the switching element, are disposed in each of the areas surrounded with the gate lines and the signal lines, and each of the areas is used as pixel.

Thus, the gate lines and signal lines are formed in a matrix shape, each of the areas enclosed with them is used as pixel, and both common electrode and pixel electrode are provided for each pixel. Consequently, the liquid crystal display device permits a graphic display of characters and pictures and has a wide field angle and a high response speed.

As to the arrangement form of the linear electrodes for forming the narrow spacing, there may be adopted any of various formed, which may be, for example, such that the common electrodes and the pixel electrode are each formed linearly and one of them is inclined relative to the other.

Likewise, there may be adopted a construction such that one of the common electrode and the pixel electrode is formed linearly and the other formed non-linearly, the non-linear electrode having a portion opposed in parallel to the linear electrode and a portion inclined relative to the linear electrode.

Further, there may be adopted a construction wherein one of the common electrode and the pixel electrode is formed linearly and the other formed non-linearly, the non-linear electrode being bent at two or more positions.

Since a narrow spacing is formed according to any of the above constructions, it is possible to increase the response speed of liquid crystal in the narrow spacing and hence possible to increase the response speed of the entire liquid crystal.

The present invention may be constructed in such a manner that a pair of polarizing plates are disposed respectively on the outer sides of a pair of substrates and polarizing directions of the paired polarizing plates are combined so as to give a bright display when the orientation of liquid crystal is controlled in the presence of a voltage applied between a common electrode and a pixel electrode and a dark display when the orientation of liquid crystal is not controlled in the absence of a voltage applied between both electrodes.

In the present invention, the brighter the display, the higher the response speed, so if the above display form is provided, then at the time of bright display in the presence of applied voltage, a high-speed response is attained in the state of bright display easily visible for the human eyes. Therefore, problems caused by a poor responsiveness are difficult to occur in comparison with the conventional structure. In the construction of the present invention, a dark display may lead to a lower response speed of liquid crystal, but this delay in response speed is difficult to be sensed by the human eyes and there is little fear of deterioration of the display quality if the display is a dark display with no orientation control performed for the liquid crystal.

BRIEF DESCRIPTION OF THE DRAWINGS

FIG. 2 is a diagram showing a sectional structure thereof;

FIG. 5 is a plan view showing a relation between applied voltage and response speed in each of the liquid crystal display device of the invention and the comparative liquid crystal display device;

DETAILED DESCRIPTION OF A PREFERRED EMBODIMENT

An embodiment of the present invention will be described in detail hereinunder with reference to the accompanying drawings.

Figure 1:
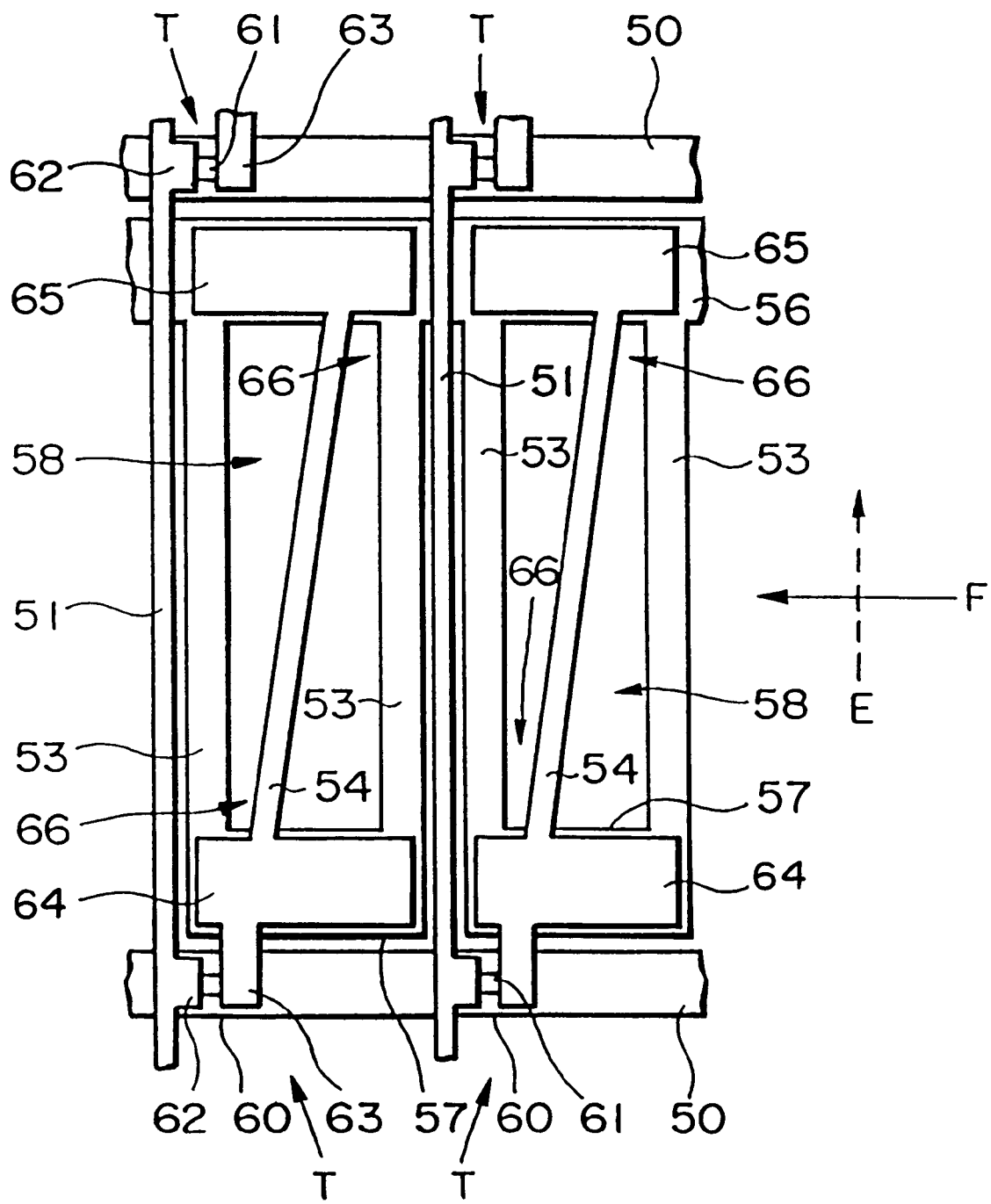
FIG. 1 is a diagram showing a first example of electrode arrangement in a liquid crystal device according to the present invention.

FIGS. 1 and 2 illustrate a principal portion of a liquid crystal display device according to the present invention. In FIG. 2, an upper substrate 40 and a lower substrate 41 are disposed opposedly in parallel with each other through a predetermined spacing (cell gap) therebetween, a liquid crystal layer 42 is formed between the substrates 40 and 41, and polarizing plates 43 and 44 are disposed on the outer surface sides of the substrates 40 and 41, respectively.

The substrates 40 and 41 are formed of glass for example, but in an actual construction, the peripheral edge portions of the substrates 40 and 41 are surrounded with a sealing material (not shown), a liquid crystal is placed in the space surrounded with the substrates 40, 41 and the sealing material to form the liquid crystal layer 42, and a liquid crystal cell 45 is constituted by combining the substrates 40, 41, liquid crystal layer 42 and polarizing plates 43, 44.

In this construction, plural gate lines 50 and signal lines 51 are formed in a matrix shape on the transparent substrate 41, and in each of the areas surrounded with the gate lines 50 and signal lines 51 are disposed linear electrodes (common electrodes) 53 and a linear electrode (pixel electrode) 54.

To be more specific, a plurality of gate lines 50 are formed on the substrate 41 in parallel with each other through a predetermined spacing, and also on the substrate 41 is formed a common line 56 along and on the same plane as the gate lines 50. Two linear electrodes 53 are extended at right angles from the common line 56 into each of the areas surrounded with the gate lines 50 and signal lines 51. Front end portions of the two linear electrodes 53 are connected together by a connection 57 in the vicinity of another gate line 50 adjacent thereto. The area surrounded with the common line 56, linear electrodes 53 and connection 57 is used as a pixel 58. In this embodiment, the connection 57 is formed at about the same width as the common line 56, but the linear electrodes 53 are each formed thinner than the connection 57, and the linear electrode 54 is formed a little thinner than each linear electrode 53.

On the substrate 41 is formed an insulating layer 58 to cover the above components, and on the insulating layer 58 are formed signal lines 51 in a matrix shape so as to be orthogonal in plan view to the gate lines 50. The portion of each gate line 50 close to a portion intersecting each signal line 51 is used as a gate electrode 60, and on the insulating layer 58 which overlies the gate electrode 60 are formed a source electrode 62 and a drain electrode 63 in a sandwiching relation to a semiconductor film 61 from both sides, to constitute a thin film transistor (switching element) T.

The source electrode 62 is connected to the associated source line 51, while the drain electrode 63 is connected to a first capacitive electrode portion 64 positioned on the insulating layer 58 which overlies the connection 57. From the first capacitive electrode portion 64 is extended a linear electrode 54 obliquely relative to the linear electrode 53. The front end side of the linear electrode 54 is connected to a second capacitive electrode portion 65 formed on the insulating layer 58 which overlies the common line 56. By the linear electrode 54 the pixel 58 is divided into two generally triangular areas. Since the linear electrodes 53,53 are inclined, a narrow spacing 66 is formed in each of the portions where the linear electrodes 53 and the linear electrode 54 approach each other. The first capacitive electrode portion 64 is formed at about the same size as the underlying connection 57, while the second capacitive electrode portion 65 is formed at about the same size as the first capacitive electrode portion 64.

It is optional whether the linear electrodes 53 and 54 used in this embodiment are to be formed by light-shielding metal electrodes or transparent electrodes, but in the case of adopting a normally black type display form it is preferable that the linear electrodes in question be transparent electrodes formed of ITO (indium tin oxide) for example.

In the liquid crystal display device of this embodiment, an orienting film (not shown) is formed on each of the liquid crystal layer 42 side of the lower substrate 41 and the liquid crystal layer 42 side of the upper substrate 40, with an orienting treatment having been applied to the orienting film in a direction nearly parallel to the longitudinal direction of the linear electrodes 53.

By the orienting treatment, the liquid crystal molecules of the liquid crystal layer 42 present between the substrates 40 and 41 are oriented homogeneously with their major axes directed in parallel with the longitudinal direction of the linear electrode 53 in the absence of an electric field.

In the structure of this embodiment, the axis of polarization of the upper polarizing plate 43 is directed in a direction (arrow E in FIG. 1) parallel to the longitudinal direction of the linear electrodes 53, while the axis of polarization of the lower polarizing plate 44 is directed in a direction (arrow F in FIG. 1) perpendicular to the longitudinal direction of the linear electrodes 53. The reference numeral 67 in FIG. 2 denotes a black mask. The black mask 67 is for covering the portion of the thin film transistor T, the portion of the gate lines 50 and the portion of the signal lines 51, whose portions do not contribute to the display. Although color filters necessary for color display are omitted in the liquid crystal display device shown in FIGS. 1 and 2, it goes without saying that where color display is to be made, color filters are disposed on the substrate 40 side to develop the colors of red (R), green (G) and blue (B) for each pixel 58 on the substrate 41 opposed to the substrate 40.

In the above structure according to the present invention, display and non-display can be switched over from one to the other by switching over the application and non-application of voltage from one to the other for the linear electrodes 53, 54 and 53, which is done by operation of the thin film transistor T as a switching element.

Figure 10A:
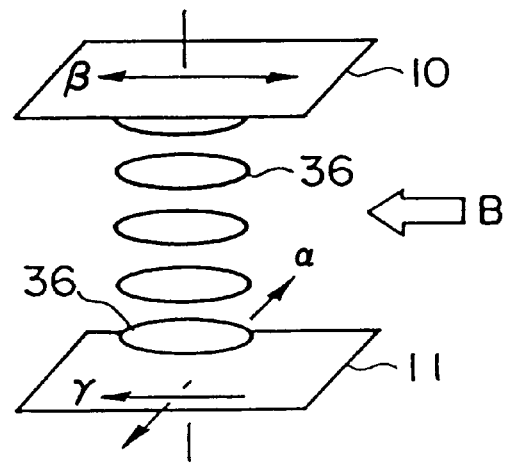
FIG. 10A is a diagram showing a liquid crystal orientation in a dark state which is described in the specification of the Japanese patent Laid-Open No. Hei7-306276(1995)
Figure 10B:
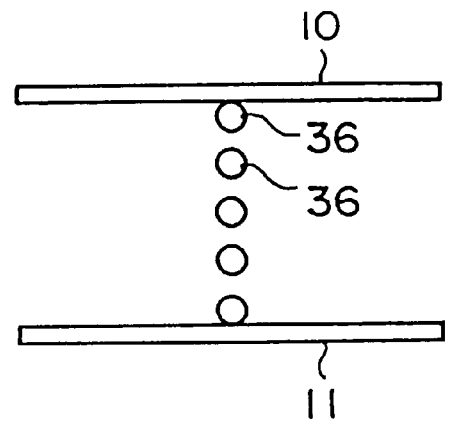
FIG. 10B is a side view thereof.
Figure 11A:
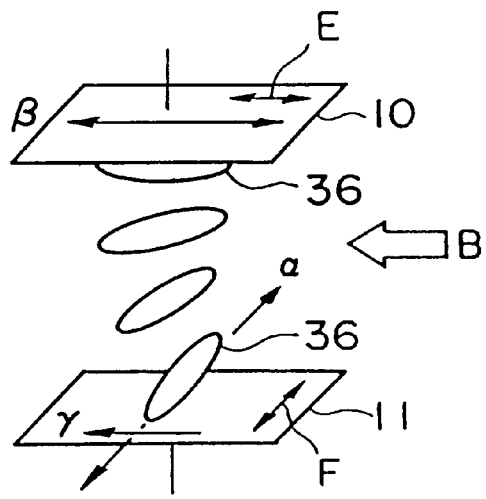
FIG. 11A is a diagram showing a liquid crystal orientation in a bright state which is described in the specification of the Japanese patent Laid-Open No. Hei7-306276(1995)
Figure 11B:
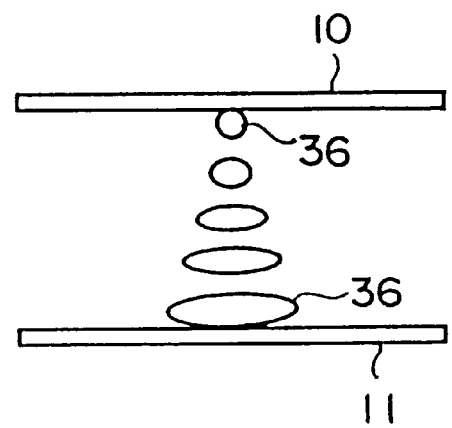
FIG. 11B is a side view thereof.
Figure 12:
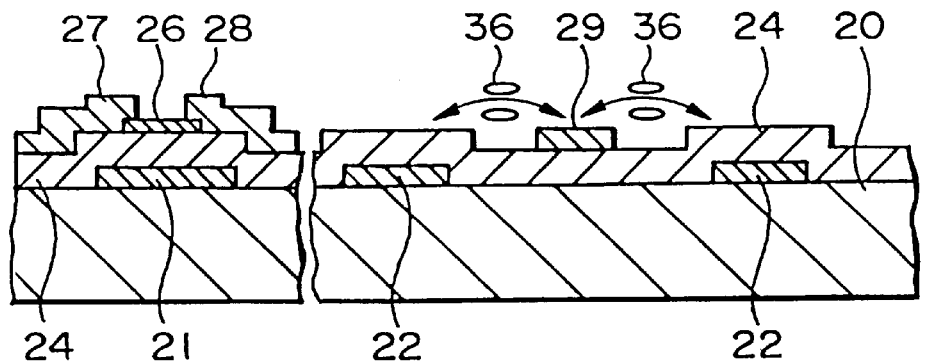
FIG. 12 is a diagram showing an example of a sectional structure of a liquid crystal display device.
Figure 13:
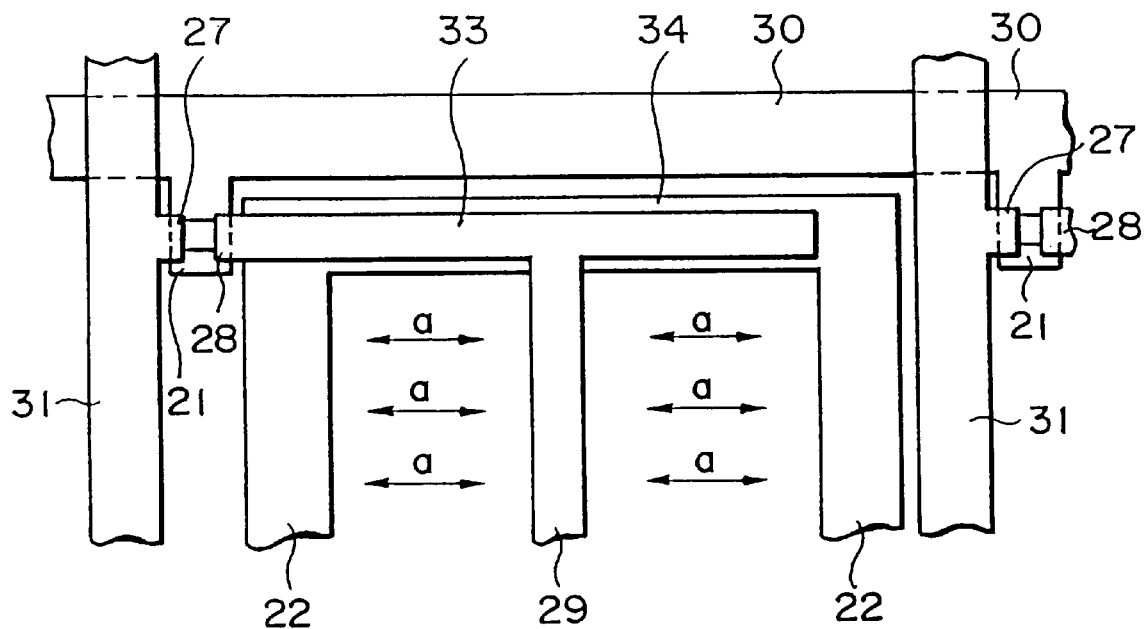
FIG. 13 is a plan view showing an example of linear electrode arrangement in the structure of FIG. 12.

More specifically, an electric field can be applied in the lateral direction in FIG. 2 by operating the thin film transistor T to apply a voltage among the linear electrodes 53, 54 and 53, whereby the liquid crystal molecules can be brought into a 90° twisted state (bright state) between the upper and lower substrates like the state shown in FIG. 11. Further, with no voltage applied among the linear electrodes 53, 54 and 53, the liquid crystal molecules can be brought into a homogeneously oriented state (dark state) in the same directions as the directions (β and γ directions) in which the orienting films have been subjected to the orienting treatment, like the state shown in FIG. 10.

The orientation of the liquid crystal molecules can be controlled in the above manner. Thus, the light introduced from the back light located on the underside of the substrate 41 can be switched over between dark state and bright state by controlling the orientation of the liquid crystal molecules. According to the display mode of this embodiment, black display is obtained when the orientation of the liquid crystal molecules is not controlled, and bright state is obtained when the orientation is controlled. Thus, the display mode in question is called a normally black display mode.

In the structure of this embodiment, since the narrow spacing 66 is formed between each linear electrode (common electrode) 53 and the linear electrode (pixel electrode) 54, the electric field generated by the linear electrodes 53 and 54 becomes strong in the narrow spacing 66, and thus the liquid crystal can be driven strongly at a high voltage, with the result that the liquid crystal can be responded at a high speed. Thus, a high-speed response of the liquid crystal can be attained in the area of the linear electrodes 53, 54, and 53 without increasing the number of linear electrodes and without decreasing the opening ratio. Further, by adopting the above structure it is possible to meet the condition that the brighter the display, the higher the response speed.

Since the brighter the display, the more sensitive man is to the response speed by adopting the above structure it is possible to quicken the response speed in the area from half tone to bright display which area can be easily recognized by man.

Figure 9:
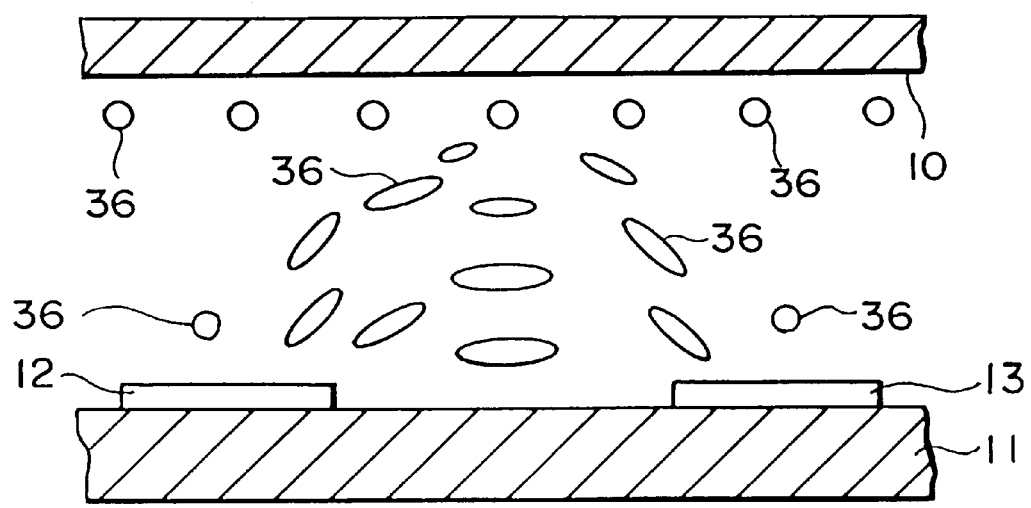
FIG. 9 is a sectional view showing in what state liquid crystal molecules are oriented when voltage is applied to linear electrodes.

Further, if the linear electrodes 53 and 54 are constructed of transparent electrode films and the display mode is switched over to the normally black type display mode, the liquid crystal molecules on the linear electrodes 53 and 54 assume a rising state similarly to the state shown in FIG. 9 when voltage is applied to those electrodes. However, since this portion also assumes a bright state to permit passage therethrough of the light from the back light to a certain extent, the portion above the linear electrodes 53 and 54 also contribute to the display, whereby the opening ratio of the liquid crystal display device can be increased.

With no voltage applied to the linear electrodes 53 and 54, the display becomes a dark state and therefore the state of liquid crystal on those linear electrodes does not exert any adverse effect on the dark-state display.

Further, the first and the second capacitive electrode portions 64 and 65 are provided, and part of the linear electrode 54 is overlapped with the common line 56 and the connection 57, the common line 56 being part of the linear electrodes 53 on the opposite pole side opposed through the insulating layer 58 to the linear electrode 54, whereby capacitance can be formed therebetween. With this capacitance, it is possible to cancel part of a parasitic capacitance induced in the liquid crystal display device, resulting in that the asymmetry, of the applied voltage which causes flicker and sticking is diminished and hence the display quality is improved.

Figure 3A:
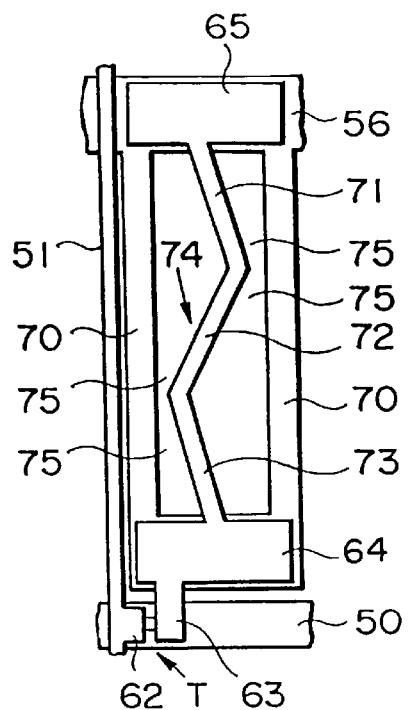
FIG. 3A is a diagram showing a second example of electrode arrangement in the display device.

FIG. 3A shows a second example of linear electrodes according to the present invention, in which a linear electrode 74 of a triangular wave shape is formed between two linear electrodes 70 which are rectilinear. The linear electrode 74 is constituted by connecting three rectilinear electrode lines 71, 72 and 73 in a triangular wave shape whose electrode lines are shorter than each linear electrode 70. The electrode line 71 is connected to the center of the second capacitive electrode portion 65, while the electrode line 73 is connected to the center of the first capacitive electrode portion 64. A narrow spacing 75 is formed between a boundary of the electrode lines 71 and 72 and one linear electrode 70 adjacent thereto, and a narrow spacing 75 is also formed between a boundary of electrode lines 72 and 73 and the other linear electrode 70 adjacent thereto.

Figure 3B:
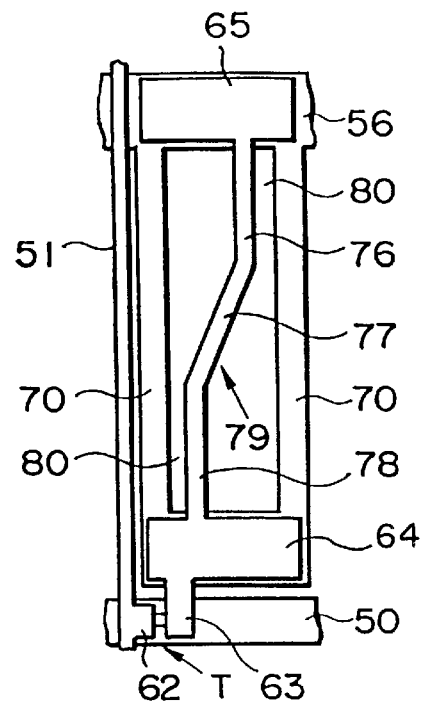
FIG. 3B is a diagram showing a third example of electrode arrangement in the display device.

FIG. 3B shows an example in which a linear electrode 79 is formed between two linear electrodes 70 which are rectilinear. The linear electrode 79 is constituted by connecting three rectilinear electrode lines 76, 77 and 78 which are shorter than each linear electrode 70. In this example, the electrode line 76 is disposed in proximity to and in parallel with one linear electrode 70, while the electrode line 78 is disposed in proximity to and in parallel with the other linear electrode 70, and an end portion of the electrode line 76 and that of the electrode line 78 are connected with each other through the electrode line 77 which is inclined relative to them, to form the linear electrode 79. A narrow spacing 80 is formed between the electrode line 76 and one linear electrode 70, and a narrow spacing 80 is also formed between the electrode line 78 and the other linear electrode 70.

Figure 3C:
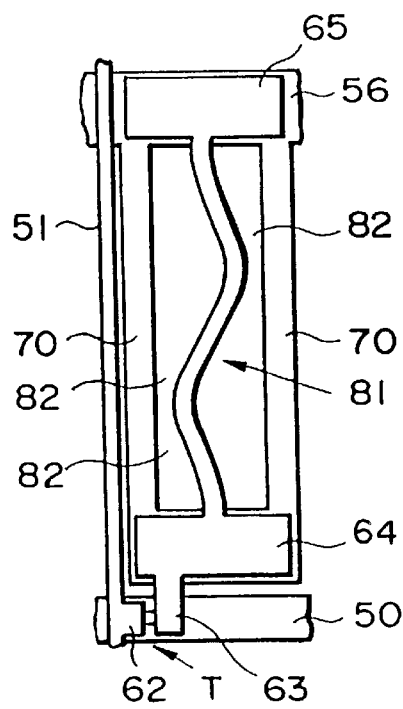
FIG. 3C is a diagram showing a fourth example of electrode arrangement in the display device.

FIG. 3C shows an example in which a wavy or sine-curved linear electrode 81 is formed between two linear electrodes 70 which are rectilinear. In this example, a narrow spacing 82 is formed in the portion where part of the linear electrode 81 is close to one linear electrode 70, and a narrow spacing 82 is also formed in the portion where part of linear electrode 81 is close to the other linear electrode 70.

Figure 3D:
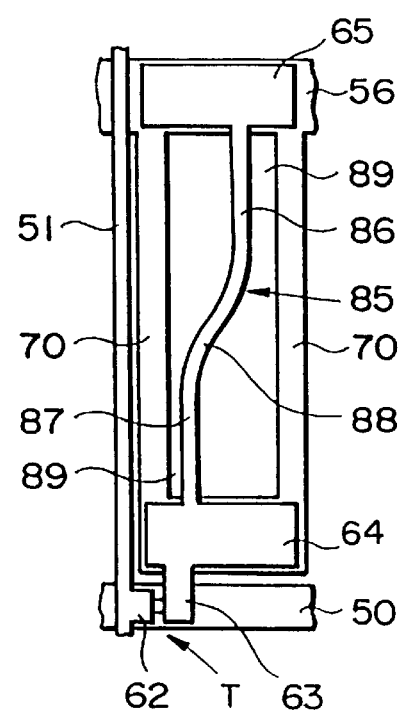
FIG. 3D is a diagram showing a fifth example of electrode arrangement in the display device.

FIG. 3D shows an example in which a linear electrode 85 is formed between two linear electrodes 70 which are rectilinear. In this example, the linear electrode 85 is formed by connecting together two rectilinear electrode lines 86 and 87 which are shorter than each: linear electrode 70 and an electrode line 88 as a connection of the two electrode lines. The electrode line 86 is disposed in parallel with a portion closer to one linear electrode 70, while the electrode line 87 is disposed in parallel with a portion closer to the other linear electrode 70, and an end portion of the electrode line 86 and that of the electrode line 88 are connected with each other through the electrode line 88 which is curved and inclined relative to them. A narrow spacing 89 is formed between the electrode line 86 and one linear electrode 70, and a narrow spacing 89 is also formed between the electrode line 87 and the other linear electrode 70.

Figure 4A:
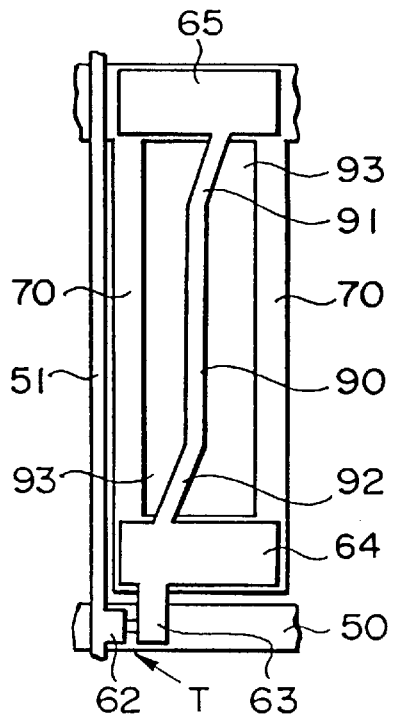
FIG. 4A is a diagram showing a sixth example of electrode arrangement in the display device.

FIG. 4A shows an example in which in the central portion between two linear electrodes 70 which are rectilinear there is formed a rectilinear electrode line 90 parallel to and somewhat shorter than each linear electrode 70, and short rectilinear electrode lines 91 and 92 are formed on both end sides of the electrode line 90. The electrode line 91 is inclined toward one linear electrode 70 and is connected to the second capacitive electrode portion 65, while the electrode line 92 is inclined toward the other linear electrode 70 and is connected to the first capacitive electrode portion 64. In this example, a narrow spacing 93 is formed between the inclined electrode line 91 and one linear electrode 70, and a narrow spacing 93 is also formed between the inclined electrode line 92 and the other linear electrode 70.

Figure 4B:
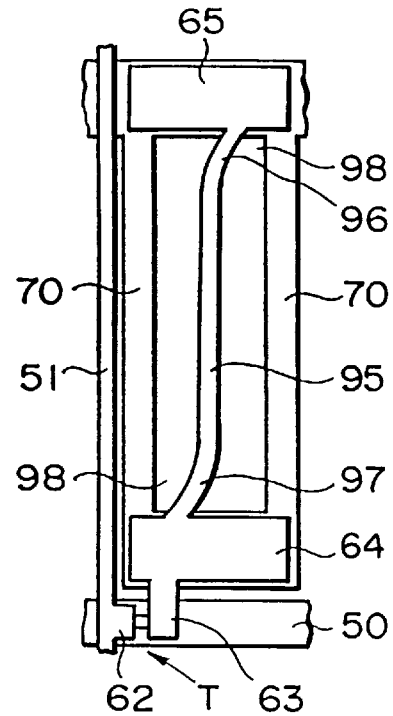
FIG. 4B is a diagram showing a seventh example of electrode arrangement in the display device.

FIG. 4B shows an example in which in the central portion between two linear electrodes 70 which are rectilinear there is formed a rectilinear electrode line 95 somewhat shorter than and parallel to each linear electrode 70, and arcuate electrode lines 96 and 97 are formed on both end sides of the electrode line 95. The electrode line 96 is inclined toward one linear electrode 70 and is connected to the second capacitive electrode portion 65, while the electrode line 97 is inclined toward the other linear electrode 70 and is connected to the first capacitive electrode portion 64. In this example, a narrow spacing 98 is formed between the electrode line 96 and one linear electrode 70, and a narrow spacing 98 is also formed between the electrode line 97 and the other linear electrode 70.

Thus, in any of the structures shown in FIGS. 3A to 3D and 4A and 4B there are formed narrow spacings 75, 80, 82, 89, 93, or 98, so there is attained a high responsiveness as in the structure of FIG. 1.

In each of the above examples, the linear electrodes (common electrodes) are formed two each in a rectilinear shape, while the linear electrode (pixel electrode) is formed in any of various shapes, but there may be adopted a structure wherein the common electrodes are formed in a non-rectilinear shape and the pixel electrode formed rectilinearly, allowing narrow spacings to be formed, or a structure wherein both electrodes are formed in a non-rectilinear shape, insofar as the object of the invention is achieved.

EXAMPLES

Using two transparent glass substrates, a thin film transistor circuit having the linear electrodes shown in FIG. 1 was formed on one of the substrates, and an orienting film was formed thereon, while also on the other substrate was formed an orienting film. Then, the orienting films were subjected to a rubbing treatment for the orientation of liquid crystal. The two transparent substrates were disposed opposedly to each other at a predetermined spacing through beads for the formation of a gap, and in this state a liquid crystal was introduced into the gap formed between the substrates, followed by bonding with a sealing material, and polarizing plates were disposed on the outer sides of the substrate, to assemble a liquid crystal cell. The orienting treatment for each orienting film was performed by rubbing a rubbing roll against the orienting film in a direction orthogonal to the longitudinal direction of the linear electrodes.

Using an inter-substrate gap of 45 $\mu$m and a nematic liquid crystal, 10 $\mu$m wide gate lines of chromium were formed at intervals of 129 $\mu$m on a substrate in the circuit of gate lines, signal lines and linear electrodes shown in FIG. 1. Further, a common line of chromium having a width of 16 $\mu$m was formed and a linear electrode perpendicular to the common line was 6 $\mu$m in width. Then, an insulating layer of SiNx was formed on them and a thin film transistor was formed on the insulating layer, whose transistor was of a construction wherein a semiconductor layer of a-Si was sandwiched in between a source electrode of chromium and a drain electrode of chromium. Further, a linear electrode of chromium having a width of 3 $\mu$m, inclined at an angle of 8.2° relative to the linear electrode formed previously on the substrate, was formed on the insulating layer in a connected state to the drain electrode, and a source line of chromium having a width of 3 $\mu$m was formed in a connected state to the source electrode, Then, an orienting film of polyimide was formed on them and subjected to an orienting treatment. On one side of the other substrate was formed an orienting film of polyimide, which was then subjected to an orienting treatment.

These substrates were assembled in such a manner that the oriented directions of the orienting films on the substrates were parallel to each other and that the polarization axes of polarizing plates disposed on the outer sides of the substrates intersected each other at an angle of 90°.

Figure 4C:
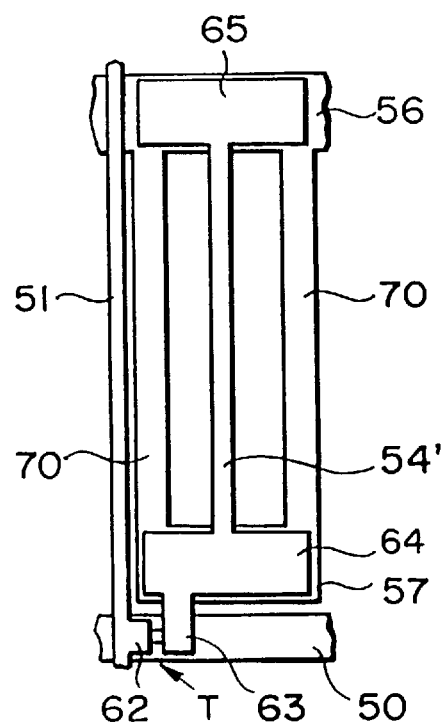
FIG. 4C is a diagram showing an example of electrode arrangement in a comparative liquid crystal display device.

Next, by way of comparison, the linear electrode structure shown in FIG. 1 was substituted by the structure shown in FIG. 4C. More specifically, there was fabricated, as a comparative liquid crystal cell, a liquid crystal cell having such a structure as shown in FIG. 4C wherein a linear electrode 54' was formed in parallel with linear electrodes 70. In this comparative liquid crystal cell, as to the structure of the other portion than the linear electrode 54', there was adopted the same structure as that of the liquid crystal cell described above.

For the liquid crystal cells thus fabricated, the applied voltage corresponding to the maximum light transmittance was assumed to be V(100), the transmittance at this time was set at 100%, and the voltages corresponding to the transmittances of 90%, 50%, 10% and 0% were assumed to be V(90), V(50), V(10) and V(0), respectively. Under these conditions there were measured values of V(0)←→V(10) (the result of having measured a response speed at a transmittance between 0% and 10% while switching over voltages corresponding to the transmittances of 0% and 10%), V(0)←→V(50) (the result of having measured a response speed while switching over voltages corresponding to the transmittances of 0% and 50%) and V(0)←→V(90) and V(0)←→V(100). The results of the measurements are shown in FIG. 5, in which the axis of ordinate represents the sum of a rise time ($\tau_r$) and a fall time ($\tau_d$).

As is apparent from the results shown in FIG. 5, the response speed in a dark area (V(0)←→V(10)) of display is lower than that in the structure of the comparative example, but in a half tone area (V(0)←→V(50)) and a bright area (V(0)←→V(90), V(0)←→V(100)) it is faster than that in the comparative example. Particularly, in the half tone area (V(0)←→V(50)) it was possible to shorten the response time to 72 msec as compared with 91 msec in the comparative example. As a whole, there is the tendency that the brighter the display, the shorter the response time.

Figure 6:
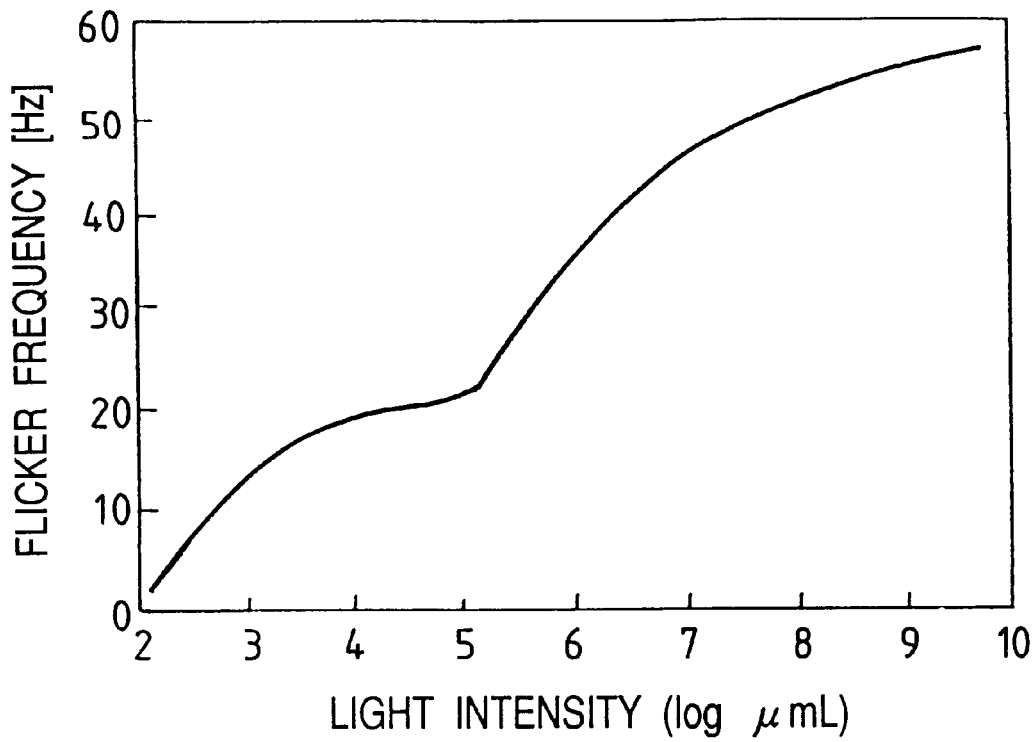
FIG. 6 is a diagram showing a relation between light intensity and flicker.
Figure 7:
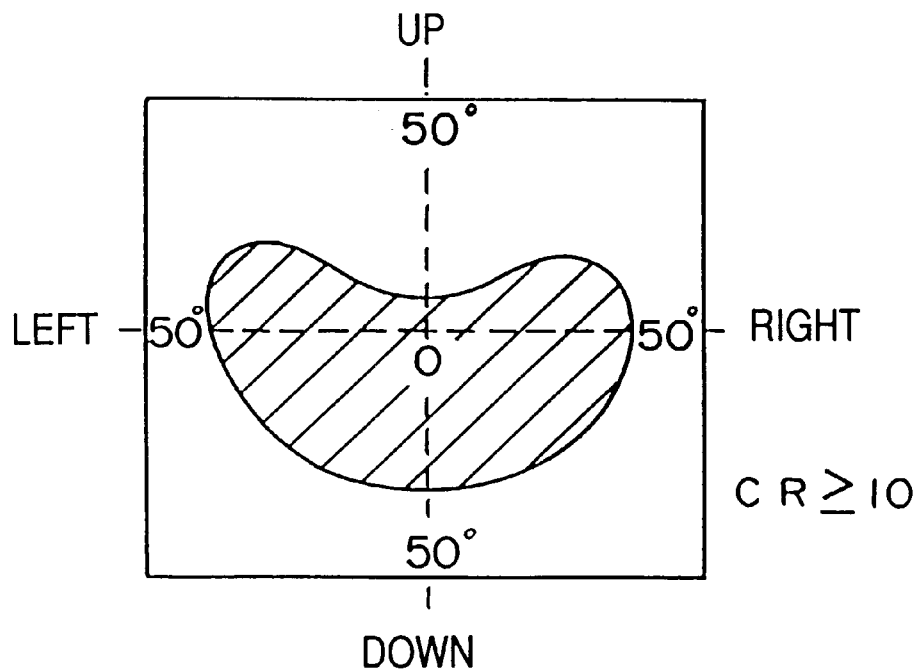
FIG. 7 is a diagram showing a general field angle dependence of a TN mode liquid crystal display device.
Figure 8:
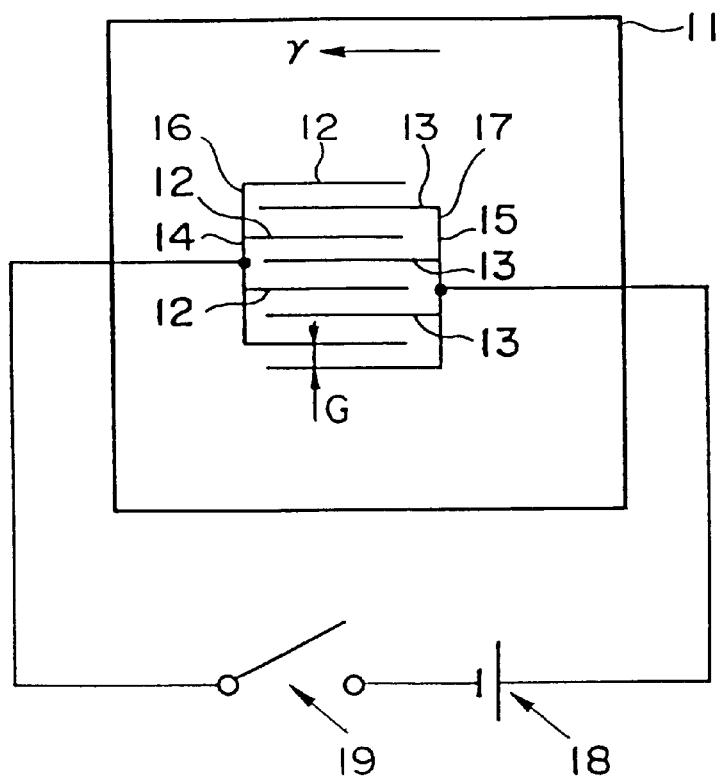
FIG. 8 is a plan view of a substrate having linear electrodes whose substrate is described in the specification of Japanese Patent Laid-Open No. Hei7-306276(1995) filed previously.

FIG. 6 shows a relation between the brightness of the liquid crystal display device and CFF (Critical Flicker Frequency: the maximum frequency at which one feels flicker when he or she sees a flashing light, in other words, at a frequency higher than CFF one no longer feels flicker).

FIG. 6 shows that the brighter the display, the higher the CFF. Thus, it is seen that the brighter the display, the higher the change with time of luminance which one can follow. It follows that the brighter the display, the more sensitive to the change with time of luminance the human eyes, and the darker the display, the less sensitive.

If the results shown in FIG. 5 are reviewed on the basis of what has been mentioned above, it is apparent that the brighter the display, the higher the response speed insofar as the liquid crystal display device has the structure of the above embodiment and has the normally black display mode, and that there is attained an improvement over the comparative example even when viewed from the standpoint of human engineering. Thus, a more effective improvement for the human eyes is attained even though the effect is not so outstanding at an average speed.

On the other hand, if the display mode is set at a normally white mode, the bright-dark tendency shown in FIG. 5 reverses, so that the effect for the human eyes is deteriorated even if an average speed is improved in comparison with the comparative example.

Although in the above embodiment the pixel electrode is provided so that two areas are present for each pixel, it goes without saying that a division may be made into one to three or more areas for each pixel. Further, although in the foregoing examples the linear electrode 54 is deformed and the linear electrodes 53 are made rectilinear, there may be adopted a construction wherein one of the two is made non-rectilinear and the other rectilinear, or both non-rectilinear, if only the linear electrodes are arranged so as to form a narrow spacing between paired linear electrodes.

What is claimed is:

1. A liquid crystal display device comprising:

a pair of substrates;

a liquid crystal layer formed between said pair of substrates;

a plurality of generally linear electrodes arranged in pairs and which are formed in a spaced, opposed relation on the liquid crystal layer side of said one substrate; and a switching element for applying a voltage between the paired electrodes and thereby applying a lateral electric field to the liquid crystal, said switching element being disposed in the vicinity of said paired electrodes, wherein one of said paired electrodes is a common electrode and the other is a pixel electrode, said pixel electrode having two ends and having a capacitive electrode portion connected to at least one end of said two ends, said pixel electrode is connected with said switching element at a portion of said pixel electrode, a space is defined between said two ends of said pixel electrode and said common electrode, both said pixel electrode and said common electrode have a constant line width at the space, and at least one of said common electrode and said pixel electrode defining the space is formed at least partially in a non-parallel relation to the other to form a narrower spacing and a wider spacing in the space.

2. A liquid crystal display device according to claim 1, wherein gate lines and signal lines are formed in a matrix shape on the liquid crystal layer side of said one substrate, and said common electrode, said pixel electrode and said switching element are disposed in each of areas surrounded by said gate lines and said signal lines, each said area is used as a pixel.

3. A liquid crystal display device according to claim 1, wherein polarizing plates are disposed respectively on the outer sides of the pair of substrates, and polarizing directions of the pair of polarizing plates are combined together so as to give a bright display when a voltage is applied between said common electrode and said pixel electrode and a dark display when no voltage is applied between both said common electrode and said pixel electrode.

4. A liquid crystal display device according to claim 1, wherein gate lines and signal lines are formed in a matrix shape on the liquid crystal layer side of said one substrate, and said common electrode, said pixel electrode and said switching element are disposed in each of areas surrounded by said gate lines and said signal lines, each said area is used as a pixel.

5. A liquid crystal display device according to claim 1, wherein polarizing plates are disposed respectively on the outer sides of the pair of substrates, and polarizing directions of the pair of polarizing plates are combined together so as to give a bright display when a voltage is applied between said common electrode and said pixel electrode and a dark display when no voltage is applied between both said common electrode and said pixel electrode.

6. A liquid crystal display device according to claim 1 wherein said switching element is connected with said pixel electrode through a first end of said two ends of said pixel electrode and a second end of said two ends of said pixel electrode is connected to said capacitive electrode portion.

7. A liquid crystal display device according to claim 1 wherein said pixel electrode is connected with said switching element through said capacitive electrode portion.

8. A liquid crystal display device according to claim 1 wherein a first end of said two ends of said pixel electrode is connected to said capacitive electrode portion and a second end of said two ends of said pixel electrode is connected to another capacitive electrode portion, and said switching element is connected with said pixel electrode through one of said capacitive electrode portion and said another capacitive electrode portion.

9. A liquid crystal display device comprising:

a pair of substrates;

a liquid crystal layer formed between said pair of substrates;

a plurality of linear electrodes arranged in pairs and which are formed in a spaced, opposed relation on the liquid crystal layer side of said one substrate; and a switching element for applying a voltage between the pair of linear electrodes and thereby applying a lateral electric field to the liquid crystal, said switching element being disposed in the vicinity of said linear electrodes, wherein one of said paired electrodes is a common electrode and the other is a pixel electrode, said pixel electrode having two ends and having a capacitive electrode portion connected to at at least one end of said two ends, said pixel electrode is connected with said switching element at a portion of said pixel electrode, a space is defined between said two ends of said pixel electrode and said common electrode, both said pixel electrode and said common electrode have a constant line width at the space, and and at least one of said common electrode and said pixel electrode defining the space is formed at least partially in a non-parallel relation to the other to form a narrower spacing and a wider spacing in the space.

10. A liquid crystal display device according to claim 9, wherein gate lines and signal lines are formed in a matrix shape on the liquid crystal layer side of said one substrate, and said common electrode, said pixel electrode and said switching element are disposed in each of areas surrounded with said gate lines and said signal lines, each said area is used as a pixel.

11. A liquid crystal display device according to claim 9, wherein said common electrode and said pixel electrode are each formed rectilinearly, and at least one of the common electrode and the pixel electrode is inclined relative to the other.

12. A liquid crystal display device according to claim 9, wherein polarizing plates are disposed respectively on the outer sides of the pair of substrates, and polarizing directions of the pair of polarizing plates are combined together so as to give a bright display when a voltage is applied between said common electrode and said pixel electrode and a dark display when no voltage is applied between both said common electrode and said pixel electrode.

* * * * *